Sept. 17, 1946.  G. T. McCLURE  2,407,890
PROTECTION VALVE DEVICE
Filed March 15, 1945
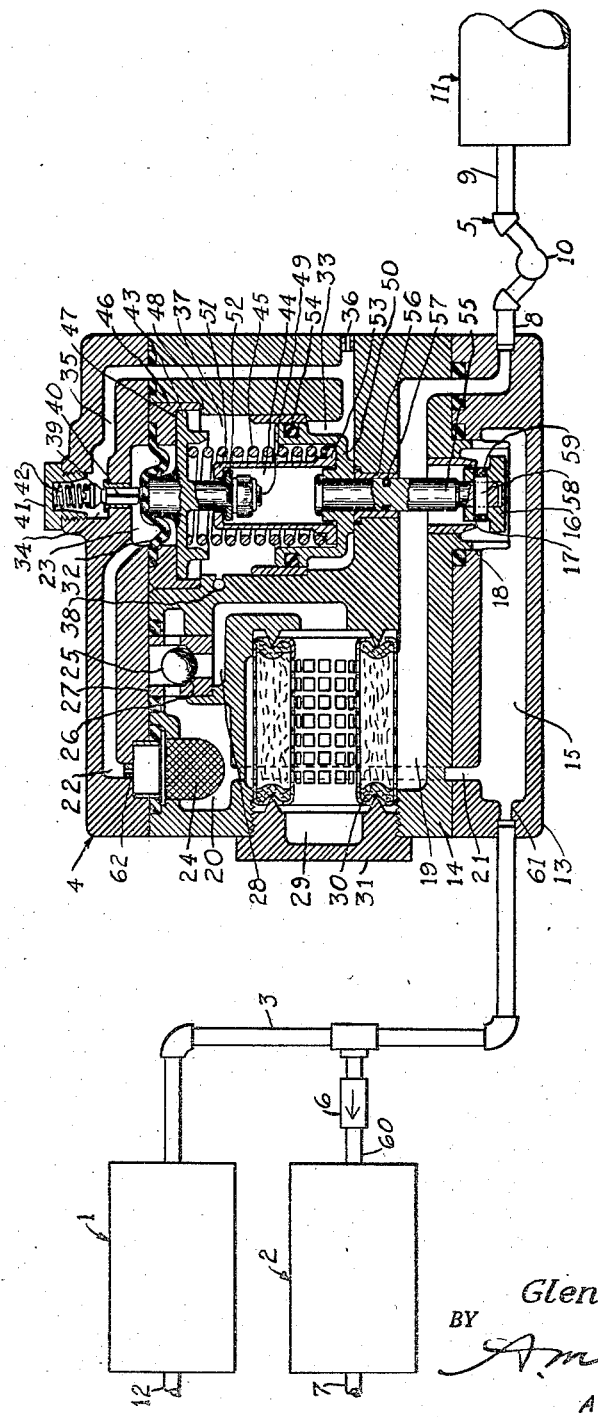
INVENTOR.
Glenn T. McClure
BY
ATTORNEY Patented Sept. 17, 1946

2,407,890

UNITED STATES PATENT OFFICE 2,407,890

PROTECTION VALVE DEVICE

Glenn T. McClure, McKeesport, Pa., assignor to The Westinghouse Air Brake Company, Wilmerding, Pa., a corporation of Pennsylvania Application March 15, 1945, Serial No. 582,934

11 Claims. (Cl. 303—84)

This invention relates to fluid pressure brakes, and more particularly to an air brake equipment of the type employed on a railway locomotive.

Diesel-powered locomotives for certain classes of railway service in some instances comprise a plurality of individual power units coupled together. For example, a complete Diesel locomotive may consist of one "A" (control) unit coupled to first and second "B" (auxiliary) units, all three power units carrying engine equipments controlled from the "A" unit. Diesel locomotives of this class are operative to exert great tractive effort, particularly at low speeds. Although such Diesel locomotives are regularly operated to great advantage and without undue risk of separation of the several units, actual experience has demonstrated that such an accident is possible, and that the leading portion of a Diesel locomotive might break away from the other units and the rest of the train. The engineer stationed in the leading portion may in fact be unaware that a break-in-two has occurred, by reason of the enormous power which that unit delivers, and as a result, the parting of the main reservoir pipe between the separated units of the locomotive may seriously impair his control of the brake equipment. The locomotive brake equipment on a multiple unit Diesel locomotive is, of course, designed to operate automatically upon parting of the brake pipe to effect an emergency application of the brakes, but if the engineer is unaware of a break-in-two and consequently allows his brake valve to remain in running position, and if, as is usually the case, the controlled emergency feature of the equipment has been set for freight service to permit only a slow rate of brake cylinder pressure development, the loss of main reservoir pressure through the broken main reservoir pipe will in a short time seriously limit the brake cylinder pressure obtainable in the leading portion of the locomotive.

It is an object of my invention to provide an improved locomotive brake equipment designed for Diesel units of the above identified class, including means operative to prevent brake failures of this nature.

Another object of the invention is to provide an improved protection valve device operative to prevent complete loss of main reservoir pressure in the leading locomotive in case of a train break-in-two.

Another object is to provide an improved protection valve device operative to supply fluid under pressure from the main reservoirs of the trailing locomotive units to those of the leading locomotive unit in the event that the compressor on the leading unit should fail.

A further object is to provide means operative to permit the flow of fluid under pressure from the main reservoirs on the first locomotive unit through the main reservoir pipe to the reservoirs on the trailing locomotive units only after the fluid under pressure in the reservoirs on the first locomotive unit attains a selected degree of pressure and operative thereafter when the fluid pressure in the main reservoir pipe is reduced to a chosen lower degree to prevent the flow of fluid under pressure from the reservoirs on the first unit to the main reservoir pipe, which means may be readily installed in an existing brake equipment for cooperation with standard brake controlling devices without impairing the normal functioning of the apparatus.

Other objects and advantages will be apparent in the following more detailed description of the invention.

The single figure in the accompanying drawing is a diagrammatic view, partly in section, of a protection valve device constructed in accordance with the invention and associated with such portions of the air brake equipment of a multiple unit Diesel locomotive as concern the invention.

In the drawing, the reference numerals 1 and 2 indicate a pair of main reservoirs which are carried on the leading locomotive unit and comprise a part of the usual air brake equipment (not shown) thereon. The main reservoirs 1 and 2 are connected by means of a pipe 3 to a protection valve device 4, which device operates to control communication between the pipe 3 and a main reservoir pipe 5, as will hereinafter more fully appear. A check valve device 6 is provided to prevent a back flow of fluid under pressure from the main reservoir 2 to the pipe 3, the main reservoir 2 being provided for the purpose of storing fluid under pressure to be supplied by way of pipe 7 to the usual air brake equipment (not shown) installed on the leading unit of a Diesel locomotive. The main reservoir pipe 5 comprises a section 8, carried on the leading locomotive unit, and a section 9 carried on the trailing locomotive unit, the sections 8 and 9 being connected by a coupling means 10. The section 9 is connected to another main reservoir 11 which comprises a part of the usual air brake equipment (not shown) for the trailing locomotive unit. It will be understood that the main reservoirs 1 and 2 are adapted to be charged with fluid under pressure delivered by way of a pipe 12 from a compressor (not shown) mounted on the leading locomotive unit and the main reservoir 11 is adapted to be charged with fluid under pressure from a suitable compressor (not shown) mounted on the trailing locomotive unit.

The protection valve device 4 may comprise a base structure 13 supporting a casing structure 14 and containing a supply chamber 15, which chamber is in constant open communication with the main reservoir 1 by way of the pipe 3. Contained in the supply chamber 15 is a supply control valve 16, which valve cooperates with a valve seat 17, formed on the end of a bushing 18, to control communication by way of said bushing between the supply chamber 15 and a passage 19, which passage connects with the main reservoir pipe 8.

Formed in the casing structure 14 is a strainer and check valve chamber 20, which chamber is in constant open communication with the supply chamber 15 by way of a passage 21 and with a diaphragm chamber 23 by way of a passage 22. For the protection of the passage 22 against the passing of dirt therethrough there is provided in chamber 20 a wire screen strainer 24 which is clamped between two sections of the casing structure 14. Also contained in the chamber 20 is a ball check valve 25 arranged for operative engagement with a valve seat 26 formed in a suitable bushing 27 mounted in the casing structure 14, the under side of the check valve 25 being in communication with the passage 19 by way of a passage 28 and a chamber 29. For the protection of the valve device 4 and the other air brake equipment when fluid under pressure from the main reservoir pipe 5 flows past the check valve 25, as will hereinafter more fully appear, a tubular air cleaner or strainer 30 of the cartridge type is mounted in the chamber 29 so as to have its inner periphery open to the passage 28 and its outer periphery exposed to the passage 19. Upon removal of a cap nut 31 which closes the outer end of the chamber 29 and has sealing engagement with one end of the strainer 30, the strainer may be readily removed for cleaning.

Clamped at its periphery between two sections of the casing structure 14 is a flexible diaphragm 32 having at its upper side the chamber 23, which chamber is constantly open to the chamber 20 by way of the passage 22 and, as shown, may be connected to a piston chamber 33 by way of a valve chamber 34 and a passage 35, the passage 35 being open to atmosphere also by way of a choke 36. At the under side of the diaphragm is a spring chamber 37 which is constantly open to atmosphere by way of a passage 38.

Contained in the valve chamber 34 is a valve 39 having a fluted stem 40 which extends through a suitable bore in the casing so that its lower end may be operatively engaged by the diaphragm 32. Interposed between and operatively engaging a cap nut 41 at the top of the chamber 34 and the valve 39 is a spring 42 which urges said valve toward its seated position.

Contained in the chamber 37 and interposed between a diaphragm follower 43 and a spring seat member 44 is a compression spring 45, which, as will hereinafter more fully appear, serves to establish the degrees of fluid pressure in the supply chamber 15 at which the valve 16 will be opened or closed. The follower 43 is slidably guided in an annular member 46, the member 46 also serving as a medium for clamping the diaphragm 32 and being arranged in the chamber 37 so as to confine the travel of the follower 43 between a surface 47 of the member 46 and a shoulder 48 provided in the peripheral wall of the chamber 37, as shown in the drawing.

The spring seat member 44 slidably engages a stud portion 49 of the follower member 43 for the purpose of retaining the spring 45 in operative engagement with the follower 43 and also for limiting, in a manner to be explained later, the upward travel of a piston member 50 mounted in the chamber 33. The member 44 is substantially tubular in shape having its upper end 51 turned inwardly for engagement with a washer 52 secured to the stud portion 49 to thereby limit the downward movement of the member 44 and having its lower end 53 flared outwardly for supporting and retaining the spring 45 at its lower end.

The piston member 50 is substantially cup-shaped for accommodating the lower ends of the spring 45 and seat member 44 and abuts the bottom surface of the seat member for propelling the same upwardly until the upper end 51 thereof engages the follower 43. A sealing ring 54 is provided in an annular groove in the periphery of the piston member 50 for preventing the leakage of fluid under pressure from the chamber 33 to the atmospheric chamber 37. The piston member 50 is further provided with a downwardly extending stem 55 which is slidably mounted in a through bushing 56 in a wall in the casing structure 14 and extends transversely through the passage 19 and bushing 18 into the supply passage 15. The stem 55 is also provided with a sealing ring 57 for preventing leakage of fluid under pressure between the passage 19 and chamber 33. Secured by means of a pin 58 and a retaining spring or clip 59 to the lower end of the stem 55 of the piston member 50 is the valve 15 which, as will later appear, may be operated thereby into engagement with the valve seat 17. It is preferred that the clearances in the mounting means of the valve 16 be sufficient to permit the valve to be self-aligning in its operation.

In charging the locomotive with fluid under pressure and under normal conditions, fluid under pressure is supplied from the usual compressor (not shown) on the leading locomotive to the main reservoir 1 by way of the pipe 12 and flows therefrom by way of the pipe 3, check valve device 6, and a pipe 60 to the main reservoir 2, from which fluid under pressure is supplied by way of pipe 7 to the usual air brake control equipment found on the leading unit of a Diesel locomotive. Fluid under pressure also flows from pipe 3 through a passage 61 to the supply chamber 15 of the protection valve device 4. At the same time fluid under pressure is also supplied to the main reservoir 11 on the trailing unit by the operation of auxiliary compressor means (not shown) mounted on that unit.

Fluid under pressure supplied to the chamber 15 of the protection valve device 4 flows from that chamber by way of the passage 21 to the chamber 20, thence by way of a choke 62, inserted in passage 22 for reasons which will appear later, and the passage 22 to the diaphragm chamber 23, whence it will flow past the fluted stem 40 and valve 39 to the piston chamber 33 by way of the passage 35. Fluid under pressure being supplied to the piston chamber 33 will also flow to atmosphere by way of choke 36 at a restricted rate. The valve 16 being unseated as shown at initial charging, fluid under pressure in chamber 15 may also flow to main reservoir 11 by way of the bushing 13, chamber 19 and main reservoir pipe 5, if the fluid pressure in the main reservoir 11 is lower, such as when the compressor (not shown) on the trailing unit is not operating.

Since the degree of fluid pressure in the chambers 23 and 33 is substantially the same and, the effective area of the piston member 50 is greater than that of the diaphragm 32, the piston member 50 will respond to a lower degree of fluid pressure than will the diaphragm 32. It will here be understood that the relative flow capacities of chokes 62 and 36 are such that the flow of fluid under pressure through choke 62 will be sufficient to maintain the fluid pressure acting on the piston member 50 at approximately that of the main reservoir against the flow of fluid under pressure to atmosphere through choke 36. When the pressure of fluid in the chamber 33 has reached a chosen degree (22 pounds for example) as determined by the valve of the spring 45, the piston member 50 will move the spring seat member 44 upwardly against the opposing pressure of the spring 45 until the valve 16 engages the valve seat 17. With this movement the piston member 50 acts through the medium of its stem 55 and the pin 58 to move the valve 16 into sealing engagement with the valve seat 17, closing communication between the chambers 15 and 19 and thus between main reservoir 1 and main reservoir 11.

However, fluid under pressure will continue to flow from chamber 15 to chambers 23 and 33 by the route previously described. When the pressure of fluid in the diaphragm chamber 23 has attained a higher chosen degree, such as 100 pounds, the diaphragm 32 will deflect downwardly in response thereto, causing the follower 43 to move downwardly until stopped by the engagement of the lower outer surface thereof with the shoulder 48 in the chamber 37. It should be noted that the spring 45 had previously been compressed a certain amount due to the upward movement of the piston member 50, consequently the force of the spring acting to oppose the downward deflection of the diaphragm was correspondingly increased.

Upon the deflection of the diaphragm 32 to its lower position the spring 42 will act to move the valve 39 from the position in which it is shown to its lower seated position, closing communication between chambers 23 and 33. This is the normal position for valve 39 on a leading unit with the brake equipment thereof fully charged. Fluid under pressure in the piston chamber 33 and the passage 35 will continue to flow to atmosphere by way of the choke 36, thereby reducing the fluid pressure in chamber 33. When the pressure of fluid in the chamber 33 acting on the lower side of the piston member 50 decreases below the pressure of the spring 45 acting on the upper side of the piston member, the spring will act to move the piston member downwardly to the position in which it is shown in the drawing. The downward movement of the piston member will cause the valve 16 to assume the position in which it is shown, this being the normal position for valve 16 on a leading unit with the brake equipment thereof fully charged. Communication is again established between the main reservoir 1 on the leading unit and the main reservoir 11 on the trailing unit by way of pipe 3, passage 61, chamber 15, bushing 18, passage 19 and main reservoir pipe 5.

It will be understood that the volume of the passage 35 and the chamber 33 is relatively small and that consequently the choke 36 will cause the fluid pressure therein to be rapidly depleted. It will be apparent therefore that substantially the full force of the spring 45 will be effective at once to open the valve 16 promptly.

It should be further explained that any temporary fluid pressure drop in the chamber 15, which might be caused by the sudden opening of the valve 16, especially with a high pressure differential across it, will not, due to the flow restricting choke 62, result in a corresponding reduction in the pressure of fluid in diaphragm chamber 23, thus insuring against an undesirable operation of the diaphragm 32 and the piston member 50 to again close the valve 16. Thus the choke 62 serves to stabilize the diaphragm so that communication from the main reservoir 1 to the piston chamber 33 is maintained closed and the communication from main reservoir 1 to the main reservoir 11 is maintained open against accidental movement.

If, however, the main reservoir line 5 is broken or opened to the atmosphere as by the accidental separation of the locomotive units, fluid under pressure in the main reservoir 1 will flow to atmosphere by way of the pipe 3, protection valve device 4, and the undesired rupture in the main reservoir pipe 5. The resulting reduction in the fluid pressure in chamber 15 of the valve device 4 will cause fluid under pressure to flow from the diaphragm chamber 23 by way of passage 22, choke 62, chamber 20 and passage 21 to chamber 15 and thence to atmosphere by way of bushing 18, passage 19 and main reservoir pipe 5. When the pressure of fluid in chamber 23 has been reduced to some chosen low degree such as eighty pounds, the predominant pressure of the spring 45 will cause the diaphragm 32 to deflect upwardly and act through the medium of the stem 40 to move the valve 39 against the opposing pressure of the spring 42 to its unseated position in which it is shown in the drawing.

With the valve 39 unseated, fluid under pressure in diaphragm chamber 23, and consequently fluid under pressure in chamber 15 connected to chamber 23 by way of passage 21, chamber 20, choke 62 and passage 22, will flow to the piston chamber 33. In response to the fluid pressure acting on the piston member 50, the piston member will move upwardly against the opposing pressure of the spring 45. This movement of the piston member will cause the valve 16 to again engage the valve seat 17, thus preventing further loss of fluid under pressure from the main reservoir 1 by way of pipe 5.

The reduction in the pressure of fluid in the main reservoir 1 will cause the compressor on the leading locomotive unit to start operating in the usual manner. This action in combination with the closing of the valve 16 might, if the choke 62 were not employed, cause a rapid increase in the fluid pressure in the diaphragm chamber 23 causing the valve 40 to seat and the valve 16 to open again before the fault causing the loss of fluid under pressure had been corrected. There would then follow another reduction in fluid pressure and a consequent rapid pumping action. This rapid pumping action is obviated by the effect of the choke 62 in the passage 22 which delays the pressure build-up in the chamber 23 and thereby lengthens the time interval between the closing and opening of the valve 16.

As previously noted, the effective area of the piston member 50 is considerably greater than that of the diaphragm 32. For this reason and also because chamber 33 is at atmospheric pressure and the pressure of the spring 45 has been reduced by the upward movement of the diaphragm, the piston member will exert a force greatly in excess of that required to propel the valve 16 to its seated position. This excess of force is desired to insure the seating of the valve even though it or the valve seat 17 might be dirty and covered with sludge which usually accumulates in the communicating pipes of a fluid pressure brake system.

Assuming now that the compressor means on the leading locomotive unit has been rendered inoperative and that the compressor means on the trailing unit is operating to supply fluid under pressure to the main reservoir 11, the various parts of the protection valve device 4 will be in the positions in which they are shown in the drawing. Fluid under pressure in the main reservoir 11 will flow therefrom to the main reservoir 1 by way of the main reservoir pipe 5, passage 19, bushing 18, chamber 15, passage 61 and pipe 3 until the exemplary 22 pounds are reached, at which time the valve 16 will be operated to its seated position in the same manner as hereinbefore described for 22 pounds of main reservoir pressure during the initial charging of the locomotive.

However, although the flow of fluid under pressure above 22 pounds from the main reservoir 11 to the main reservoir 1 is interrupted at valve 16, this flow will continue from passage 19, and reservoir 11, by way of strainer 30 in chamber 29, passage 28, past ball check valve 25, chamber 20, passage 21, chamber 15, passage 61 and pipe 3. When a fluid pressure of 100 pounds is attained in the main reservoir 1 and a camber 23 of the protection valve 4, the same operation for unseating the valve 16 will take place as previously described in connection with the initial charging of the locomotive.

It will thus be seen that the greatest possible protection for the braking means on the leading unit of the locomotive against loss of fluid under pressure is provided by the protection valve device 4 embodying the invention. It prevents the passing of fluid under pressure from the first main reservoir to the main reservoir pipe until operating pressures with a marginal degree of safety are available. When, due to some failure behind the leading locomotive unit, the margin of safety is lost the main reservoir 1 will again be segregated from the main reservoir pipe leading to the trailing locomotive units. If, for any reason, the fluid pressure supply to the first main reservoir should fail and fluid under pressure is available in any of the trailing units, the protection valve device will then operate to supply fluid under pressure from the main reservoir pipe to the first main reservoir. Upon attaining safe operating pressures in the first main reservoir, the protecting valve device will again function to retain those pressures if the fluid under pressure in the main reservoir pipe is being depleted beyond a safe degree.

Having now described my invention, what I claim as new and desire to secure by Letters Patent, is:

1. The combination with a fluid conducting conduit normally charged with fluid under pressure, of a valve device comprising a casing having two communicating passages constituting a portion of said conduit, a valve operative to open and close the communication between said passages, movable abutment means for actuating said valve and operative in response to fluid pressure for closing said valve, a spring urging the movable abutment in a direction for opening said valve, and valve means for controlling communication between one of said two passages and said movable abutment means, said valve means being responsive to a reduction in fluid pressure in said one passage to a predetermined degree to open the latter communication and responsive to an increase in fluid pressure in said one passage to a predetermined higher degree to close the latter communication.

2. The combination with a fluid conducting conduit normally charged with fluid under pressure, of a valve device comprising a casing having two communicating passages constituting a portion of said conduit, a valve operative to open and close the communication between said passages, movable abutment means for actuating said valve and operative in response to fluid pressure for closing said valve, a spring urging the movable abutment in a direction for opening said valve, valve means for controlling communication between one of said two passages and said movable abutment means, said valve means being responsive to a reduction in fluid pressure in said one passage to a predetermined degree to open the latter communication and responsive to an increase in fluid pressure in said one passage to a predetermined higher degree to close the latter communication, and means for reducing the pressure of fluid acting on said movable abutment means.

3. In a fluid pressure flow control valve device comprising a casing having two connected passages through which fluid under pressure may flow from one section of a fluid conduit to another spaced section of the conduit, a valve mounted in said casing and operative to one position to close communication between said passages and operative to another position to open communication between said passages, means responsive to the pressure of fluid in one of said passages for actuating said valve to its closed position and responsive to a reduction in the pressure of fluid acting thereon for actuating said valve to its open position, a second valve having a position for establishing communication through which the fluid under pressure in said one passage may be supplied to said means and having a position for closing said communication, a movable member responsive to an increase in fluid pressure in said one passage to a chosen degree for effecting the operation of said second valve to its communication closing position and responsive to a reduction in the fluid pressure in said one passage for effecting the operation of said second valve to its communication establishing position, and means for reducing the pressure of fluid acting on said means.

4. In a fluid pressure flow control valve device having two connected passages adapted to establish communication between two fluid conducting conduits, a valve operative to one position to close the connection between said passages and operative to another position for opening the communication between said passages, means operative by fluid under pressure from one of said passages for actuating said valve to close the connection between said passages and operative upon a reduction in the pressure of fluid supplied thereto for actuating said valve to open the connection between said passages, valve means responsive to variations in the pressure of fluid in said one passage for controlling the pressure of fluid acting on the first mentioned means, a passage by-passing said valve and leading from the other of said passages to said one passage through which fluid under pressure may flow from said other passage to said one passage when said valve is closed, and means interposed in the by-pass passage for preventing the flow of fluid therethrough from said one passage to said other passage.

5. In a fluid pressure flow control valve device having two connected passages adapted to establish communication between two fluid conducting conduits, a valve operative to one position to close the connection between said passages and operative to another position for opening the connection between said passages, means operative by fluid under pressure from one of said passages for actuating said valve to close the connection between said passages and operative upon a reduction in the pressure of fluid supplied thereto for actuating said valve to open the connection between said passages, valve means responsive to variations in the pressure of fluid in said one passage for controlling the pressure of fluid acting on the first mentioned means, a passage by-passing said valve and leading from the other of said passages to said one passage through which fluid under pressure may flow from said other passage to said one passage when said valve is closed, means interposed in the by-pass passage for preventing the flow of fluid therethrough from said one passage to said other passage, and fluid cleaning means interposed in the by-pass passage at a point located between said other passage and the last mentioned means.

6. The combination with a fluid conducting conduit of a fluid pressure flow control valve device comprising a casing having two fluid flow connecting passages constituting a portion of said conduit, a valve operable to open and close the fluid flow connection between said passages, means responsive to fluid pressure for operating said valve to close said connection and responsive to a reduction in fluid pressure for operating said valve to open said connection, means for reducing the fluid pressure acting on the first mentioned means at a relatively slow rate, and valve means operative to supply fluid under pressure from said one passage to the first mentioned means to effect the operation to close said valve and operative in response to a certain degree of fluid pressure acting thereon to interrupt said supply, thereby causing the first mentioned means to operate said valve to open said connection, said valve means being conditioned as an incident to the opening of said valve to respond to a degree of fluid pressure acting thereon lower than said certain degree for again supplying fluid under pressure from said one passage to the first mentioned means.

7. The combination with a fluid conducting conduit of a fluid pressure flow control valve device comprising a casing having two fluid flow connecting passages constituting a portion of said conduit, a valve operable to open and close the fluid flow connection between said passages, means responsive to fluid pressure for operating said valve to close said connection and responsive to a reduction in fluid pressure for operating said valve to open said connection, means for reducing the fluid pressure acting on the first mentioned means at a relatively slow rate, valve means operative to supply fluid under pressure from said one passage to the first mentioned means to effect the operation to close said valve and operative in responsive to a certain degree of fluid pressure acting thereon to interrupt said supply, thereby causing the first mentioned means to operate said valve to open said connection, said valve means being conditioned as an incident to the opening of said valve to respond to a degree of fluid pressure acting thereon lower than said certain degree for again supplying fluid under pressure from said one passage to the first mentioned means, means for controlling the rate at which fluid is supplied to said valve means to prevent the pressure in said valve means from being varied prematurely.

8. The combination with a fluid conducting conduit, of a fluid pressure flow control valve device comprising a casing having two connected passages constituting a portion of said conduit, a valve operable to open and close the connection between said passages, a movable member responsive to fluid pressure for operating said valve to close said connection and responsive to a reduction in the fluid pressure for operating said valve to open said connection, means for reducing the fluid pressure acting on the movable member at a relatively slow rate, and valve means responsive to variations in the pressure of fluid in said one passage to control the supply of fluid under pressure from said one passage to said movable member and thereby the fluid pressure acting on said movable member, said valve means being operative in response to a certain degree of fluid pressure to supply fluid under pressure to said movable member to effect the operation of said valve to close said connection and being conditioned as an incident to the connection closing operation of said valve to be operative at a degree of fluid pressure higher than said certain degree to interrupt the supply of fluid under pressure from said one passage to said movable member.

9. The combination with a fluid conducting conduit, of a fluid pressure flow control valve device comprising a casing having two connected passages constituting a portion of said conduit, a valve operable to open and close the connection between said passages, a movable member responsive to fluid pressure for operating said valve to close said connection and responsive to a reduction in the fluid pressure for operating said valve to open said connection, means for reducing the fluid pressure acting on the movable member at a relatively slow rate, valve means responsive to variations in the pressure of fluid in said one passage to control the supply of fluid under pressure from said one passage to said movable member and thereby the fluid pressure acting on said movable member, said valve means being operative in response to a certain degree of fluid pressure to supply fluid under pressure to said movable member to effect the operation of said valve to close said connection and being conditioned as an incident to the connection closing operation of said valve to be operative at a degree of fluid pressure higher than said certain degree to interrupt the supply of fluid under pressure from said one passage to said movable member, and means for restricting the rate at which fluid under pressure is supplied to the valve means to prevent the pressure of fluid in said valve means from increasing at such a fast rate as to cause the valve means to operate prematurely to interrupt said supply.

10. In a fluid pressure brake system comprising a plurality of fluid pressure reservoirs interconnected by means of a common conduit in which system it is desired to maintain fluid in one reservoir at pressures above a chosen degree, a protection valve device interposed between said one reservoir and said conduit comprising a casing having two connected passages one of which is connected to said one reservoir and the other to said conduit, a valve operative to one position to close the connection between said passages and operative to another position to open the connection between said passages, a movable member responsive to fluid pressure for operating said valve to close said connection and responsive to a reduction in the fluid pressure for operating said valve to open said connection, means for reducing the fluid pressure acting on the movable member at a relatively slow rate, valve means responsive to variations in the pressure of fluid in said one passage to control the supply of fluid under pressure from said one passage to said movable member and thereby the fluid pressure acting on said movable member, said valve means being operative in response to a certain degree of fluid pressure to supply fluid under pressure to said movable member to effect the operation of said valve to close said connection and being conditioned as an incident to the connection closing operation of said valve to be operative at a degree of fluid pressure higher than said certain degree to interrupt the supply of fluid under pressure from said one passage to said movable member, and a unidirectional flow passage by-passing said valve through which fluid under pressure may flow from said other passage to said one passage.

11. In a fluid pressure brake system comprising a plurality of fluid pressure main reservoirs interconnected by means of a common conduit in which system it is desired to maintain fluid in one reservoir at pressures within a chosen range, a protection valve device interposed between said reservoir and said conduit comprising a casing having one passage open to said conduit and another passage open to said one reservoir, a valve controlling communication between said passages, piston means connected to said valve and operative to one position to close said valve in response to a constant supply of fluid at a pressure above a certain chosen degree and operative to another position upon the interruption of said supply to open said valve, and valve means open for supplying fluid under pressure from said one reservoir to said piston means, said valve means being conditionable by said piston means when in said one position to respond to an increase in fluid pressure to a predetermined degree above said chosen degree to close said communication and to respond to a decrease in fluid pressure to a certain predetermined lower degree to open said communication.

GLENN T. McCLURE.